W. P. COHOE.
METHOD OF MAKING A FERMENTABLE PRODUCT FROM CELLULOSIC AND LIGNEOUS MATERIALS.
APPLICATION FILED JAN. 19, 1910.
985,725.
Patented Feb. 28, 1911.
2 SHEETS—SHEET 1.
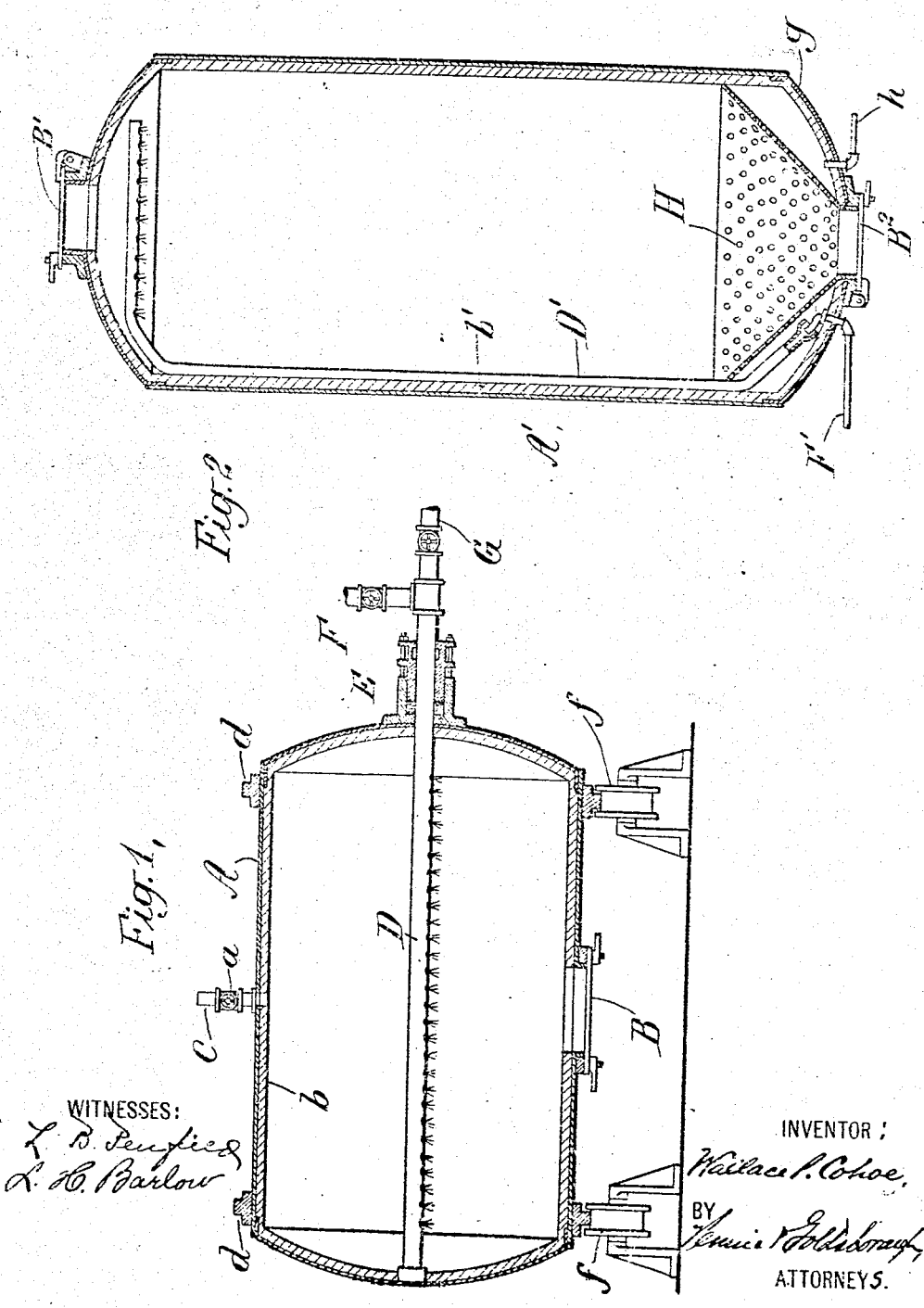

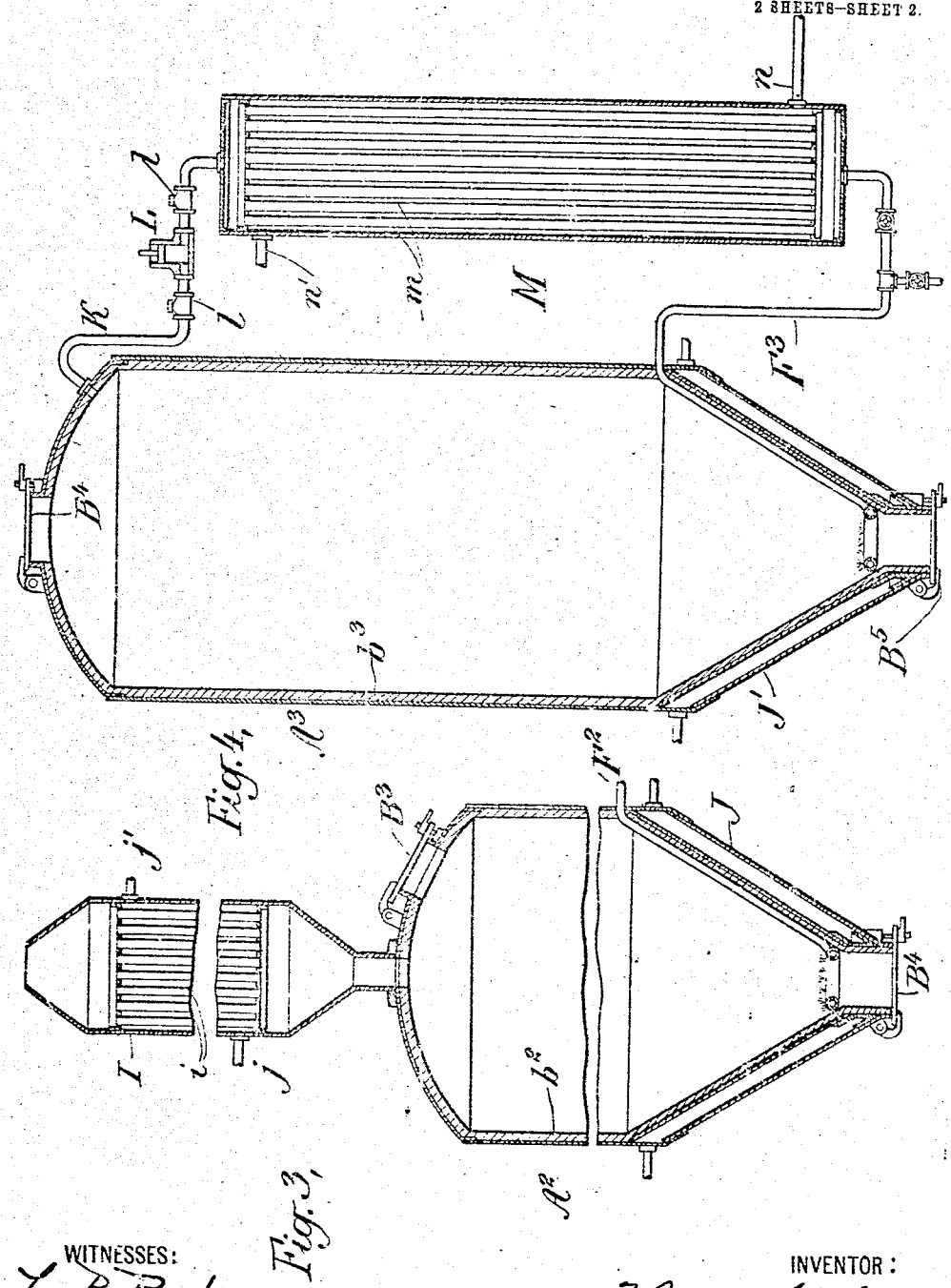

UNITED STATES PATENT OFFICE.

WALLACE P. COHOE, OF TORONTO, ONTARIO, CANADA.

METHOD OF MAKING A FERMENTABLE PRODUCT FROM CELLULOSIC AND LIGNEOUS MATERIALS.

985,725.  Specification of Letters Patent.  Patented Feb. 28, 1911.

Application filed January 19, 1910. Serial No. 538,797.

*To all whom it may concern:*

Be it known that I, WALLACE P. COHOE, a subject of the King of Great Britain, residing at the city of Toronto, Province of Ontario, Canada, have invented certain new and useful Improvements in Methods of Making a Fermentable Product from Cellulosic and Ligneous Materials; and I do hereby declare the following to be a full, clear, and exact description of the invention, such as will enable others skilled in the art to which it appertains to make and use the same.

My invention relates to certain new and useful improvements in obtaining a fermentable glucoselike product from cellulosic material and ligneous material: that is to say, from cellulose and from the lignins, or both, as the case may be, and especially from sawdust and other waste wood products, such material being either in the untreated condition, or having been previously treated by an incomplete hydrolyzing process.

Prior to my invention, it has been proposed to treat sawdust and similar waste wood products with sulfurous acid and with a mixture of sulfurous and sulfuric acids, and it has even been suggested, in some instances, that for the sulfuric acid employed in admixture with sulfurous acid there may be used a corresponding quantity of hydrochloric acid. In practice, however, for various reasons, the art has finally limited itself to the employment of sulfurous acid alone, and, in so far as I am aware, there is at present no commercial utilization of any other acid than sulfurous acid for the purposes in question.

The employment of sulfurous acid, either with or without an addition of sulfuric acid, is attended with the objection that the hydrolized product is quite dark and, furthermore, that the hydrolyzing action is incomplete, the percentage of conversion being relatively low. This is largely due to the fact that the hydrolyzing action of sulfurous acid is exercised almost entirely upon the lignin components of wood, the cellulose being comparatively unaffected. Even when the residual mass from an initial treatment with sulfurous acid is again subjected to the action of an additional quantity of sulfurous acid, there is comparatively little increase in the ultimate yield,—a circumstance which further emphasizes the relatively minor effect of sulfurous acid as a hydrolyzing agent upon cellulose.

According to the process of the present invention, by the employment of a weak solution of hydrochloric acid under proper conditions as the hydrolyzing agent a very much greater output of fermentable product can be obtained from the cellulose and lignin of the ligneous material treated. Indeed, by carefully following the procedure hereinafter indicated, it is possible to obtain almost the maximum yield, and likewise to obtain a clear product of light color, which is readily fermentable. In obtaining this product, it is found that the hydrochloric acid has hydrolyzed not only the lignins, but also the cellulose, and tests have shown that it is an efficient hydrolyzer of cellulose *per se*, *i. e.*, cellulose whether associated with the lignins or not. A striking and characteristic exemplification of the advantage of the employment of hydrochloric acid in this regard is afforded by the circumstance that after sawdust or other wood waste has been subjected to the hydrolyzing action of a solution of sulfurous acid in the usual commercial way, the residue may be further hydrolyzed by subjecting it to the action of hydrochloric acid in accordance with the process herein described, so as to recover a large additional amount of fermentable product.

Further features of my invention include the collecting of the reaction gases from the mass that is being treated with the weak solution of hydrochloric acid and the circulating of the gases through the mass as the operation proceeds. This circulation of the gases insures uniform action by preventing stratification and localization of the different gases in the mixture. So also, my invention includes the feature of progressively withdrawing from the sphere of the reaction the fermentable or hydrolyzed products as they are produced, this withdrawal being found to largely facilitate the operation and to result in a greater output per unit of time. It is probable that the increased efficiency thus obtained in the hydrolyzing process is due to the fact that, by removing the hydrolyzed products or sugars either continuously or from time to time as they accumulate in the reaction vessel, the balancing or partial reversal of the hydrolyzing reaction due to mass action is prevented, thus allowing the formation of the sugars to go on uninterruptedly.

Further features of the process, such as the conducting of the operation, in some instances, under high pressure and at a high temperature and with the injection of live steam, and also either in a "dry" way or in a "wet" way and with or without a return condenser, will be hereinafter more particularly described.

In the accompanying drawing, I have illustrated, more or less diagrammatically, suitable forms of apparatus for carrying the invention into practice.

In the drawings, Figure 1 represents a central horizontal section of a rotary form of apparatus suitable for the purpose; Figs. 2, 3 and 4 represent in vertical section stationary forms of apparatus which may be employed according to the particular requirements of use.

Although, as hereinbefore indicated, my invention is applicable to the treatment of either cellulose or lignins *per se*, it will have its chief application in the treatment of sawdust and other waste wood products wherein cellulose is associated with the lignins, and the mode of operation incident to the practice of the invention will therefore be sufficiently indicated by reference to the treatment of sawdust.

In the so-called "dry" treatment ("dry cook") of the sawdust or other waste wood product acted upon, the amount of the dry constituents of the material is first determined or approximately estimated. Sawdust usually contains from twelve to fifty per cent. of moisture. For the treatment of sawdust in the dry way there may be added to the sawdust a solution of hydrochloric acid of such strength that there will be present in the mixture from ½ to 2% of HCl based on the weight of the dry constituents of the sawdust. To this there is then added enough water to bring the total weight of the solution up to the weight of the dry constituents of the sawdust. The water may be added in a vaporized condition. In the so-called "wet" treatment ("wet cook") the same relative proportion of HCl to the weight of the dry constituents of the sawdust is employed but there is added an amount of water sufficient to bring the weight of the water up to from four to five times the weight of the dry constituents of the sawdust.

The apparatus shown in Fig. 1 is particularly adapted to the treatment of the sawdust by a dry cook. Generally stated, the apparatus, shown in Fig. 1, consists of a rotary cylinder A provided with a charging door B and with a blow-off pipe C having a controlling valve $a$. The cylinder is provided internally with a lining of a material $b$ resistant to the action of hydrochloric acid, as, for instance, asbestos impregnated with "bakelite", a product resulting from the condensation of phenols with formaldehyde. The cylinder is further provided with bands or tires $d$ and is mounted to rotate in any suitable manner upon supporting rolls $f$; its rotation being effected by any appropriate driving mechanism, not shown. The cylinder is likewise provided with an axial pipe D, which may be made of any suitable acid-resisting material, such as bakelite; or it may be of metal coated with bakelite. This pipe is provided with a suitable number of perforations along its length. If desired, the cylinder may be further provided with longitudinal wings along its cylindrical side walls for lifting and dropping the material during the rotation of the apparatus. The apparatus shown in Fig. 1 is, therefore, a drum digester. Its axial pipe D is intended to be stationary during the revolution of the drum, and a stuffing box E is provided whose main elements may conveniently be made of bakelite and graphite, or of metal lined with bakelite or similar acid-proof enamel.

In operation, the drum digester may be filled three-fourths full of dry sawdust whereupon live steam under say sixty-five pounds pressure is admitted from the steam pipe F into the axial pipe D and thence into the mass. To this steam will be added the hydrochloric acid which may be admitted through the pipe G. The digester may be rotated during the operation and the treatment will be continued until the contents of the digester reach a temperature of about 145° C. and condensation and reaction have resulted in the formation of a solution of sugars in the sawdust. The attainment of this temperature indicates the completion of the operation and the admission of steam is thereupon interrupted and the digester is brought into the position indicated in Fig. 1, that is to say, with the blow-off pipe C at the top. By opening the valve $a$ the gaseous and vaporous contents of the digester may be blown off and may advantageously be taken into condensers and absorbing towers so as to condense and save the acetic acid, hydrochloric acid, furfurol and the like contained therein. The contents of the digester may then be dumped through the dumping door B, and the glucose-like product may then be extracted by means of hot water. It is found that from 25% to 29% of the dry sawdust is converted into fermentable glucose-like products by this treatment, the most favorable results as to yield being obtained by using a solution containing from 1½% to 2% of hydrochloric acid. The syrups resulting from the extraction of the digested mass are light in color and not dark (almost black) as is the case when sulfurous and sulfuric acids are employed. For this reason they may be clarified much more easily, and as high as 80% and upward of the yield of converted products is fermentable to ethyl alcohol. It is found that the residue left over after extracting the glucose-like product from the mass resulting from the first operation in the digester may be to advantage subjected to a further treatment, in the same way, and that an additional quantity of the glucose-like product may be obtained therefrom which may in like manner be extracted by means of hot water. The first treatment may, as stated, be with sulfurous acid if desired. This successive treatment of the same mass enables the yield of the glucose-like product to be largely increased, thereby giving correspondingly improved commercial results.

The form of apparatus shown in Fig. 2 is particularly adapted for continuous working and for a wet cook. The digester shown in said figure is of the stationary type consisting of a vertical shell $A'$ having a lining $b'$ resistant to hydrochloric acid. The digester is provided above with a charging door $B'$ and below with a dumping door $B^2$ and likewise has at its lower portion a perforated bottom H which may conveniently be of conical form so as to facilitate the final discharge of the mass after treatment, and to provide a space $g$ which communicates by a pipe $h$ with a suitable trap whereby any portion of the liquid collecting in the space $g$ may be drawn off from time to time. Steam may be admitted through the pipe $F'$ and is conveyed upwardly through an inner pipe $D'$ terminating at its upper portion in a perforated branch located in the upper portion of the digester. The mass of sawdust together with the weak solution of hydrochloric acid is charged into the digester preferably in the proportions best adapted for the wet cook, as hereinbefore indicated and a circulation of the liquid is maintained through the mass by reason of the injecting action of the steam jet, which carries the liquid as it drains through the perforated bottom through the pipe $D'$, discharging it upon the upper surface of the mass, through which it again descends into the space $g$. As the solution of glucose-like product accumulates, the solution can be tapped off in part from time to time thereby withdrawing the tapped-off portions from the sphere of the reaction. The losses in solution are supplied by condensation of the steam and by appropriate additions of hydrochloric acid which may be taken in through the steam pipe or otherwise supplied so as to maintain the desired percentage of hydrochloric acid for the efficient operation of the process.

In the form of apparatus shown in Fig. 3 which is likewise intended to be used for a wet cook, the upright digester $A^2$ having a lining $b^2$ and having charging and dumping doors $B^3$, $B^4$ is designed to be operated at atmospheric pressures and is surmounted with a condenser I, which may conveniently consist of a number of vertical tubes $i$ through which the vapors from the digester rise and in which they are condensed by means of a cooling body of water admitted through the water-inlet pipe $j$ and issuing from the water exit pipe $j'$. It will be found, in some cases, convenient to heat the digester (which, together with the condenser, is shown foreshortened in this figure) by means of a steam jacket J, or, in lieu thereof, or in addition thereto by means of steam admitted through a pipe $F^2$ terminating in a perforated coil at the lower part of the digester as shown. In fact, the initial heating of the mass may be supplied wholly by the steam injected through the pipe $F^2$ if desired.

In the form of apparatus shown in Fig. 4 the upright digester $A^3$ with its lining $b^3$, charging door $B^4$ and dumping door $B^5$ is likewise preferably provided with a steam jacket $J'$ and with a steam injecting pipe $F^3$ terminating in a perforated coil at the bottom of the digester. In this instance, the digester may be used to treat the sawdust in accordance with the dry cook method, if desired and, in fact, this particular form of apparatus is preferred for the dry cook method when a rotating digester is not employed. The operation is conducted at a high temperature and under high pressure as in the rotary digester and the reacting gases of the dry cook are withdrawn through the conduit K by means of a pump L and are reintroduced through the pipe $F^3$ into the bottom of the digester, thus obtaining the desired circulation. On opposite sides of the pump are provided the usual check valves $l$ and the tension of the gases withdrawn and reinjected is raised by passing them downward through the tubular heater M having a series of pipes $m$ which are heated externally by steam entering through the pipe $n$ and issuing at the pipe $n'$.

As hereinbefore indicated, it will of course be understood that wherever any of the surfaces of the apparatus are brought into contact with the hydrochloric acid they are to be suitably protected by an enamel or other coating of sufficient resistance to hydrochloric acid to protect them against corrosion. Furthermore, wherever, in the various forms of apparatus a dry cook or a wet cook is employed, the prescribed conditions for obtaining the best results are preserved; that is, the preferred minimum amount by weight of the solution with respect to the dry constituents of the saw dust is used when a dry method is followed and the preferred maximum weight of the solution with respect to the dry constituents of the saw dust is employed when the wet method is followed. It will furthermore be noted that in either event, the employment of a high temperature and a high pressure is of advantage, especially in hastening the reactions and that the features of withdrawing the glucose-like products from time to time as they are formed, the continuous treatment of the mass and the re-treatment of residues from prior operations are of advantage whether the dry method or the wet method is practiced.

Having thus described my invention, what I claim is:

1. In the manufacture of glucose-like products from woody material such as sawdust and the like, the process which comprises exposing such material in a dry condition to a current of steam carrying a volatile hydrolyzing acid until a solution of sugars is formed; substantially as described.

2. In the manufacture of glucose-like products from woody material such as sawdust and the like, the process which comprises hydrolyzing a mass of such material in a dry condition by injecting steam together with hydrochloric acid into the mass to be hydrolyzed until a solution of sugars is formed; substantially as described.

3. In the manufacture of glucose-like products from woody material such as sawdust and the like, the process which comprises hydrolyzing such material in a dry condition by injecting hydrochloric acid into said material by means of a current of steam until a solution of sugars is formed; substantially as described.

4. The process of producing glucose-like products from woody material such as sawdust and the like, which comprises exposing the same to the action of a current of steam carrying a volatile hydrolyzing acid until a mass of sugary liquid accumulates, sugary liquid being removed from time to time to prevent interference with the hydrolyzing reaction; substantially as described.

5. The process of producing glucose-like products from woody material such as sawdust and the like, which comprises exposing a mass of such material to the action of a current of steam carrying a volatile hydrolyzing acid until a mass of sugary liquid accumulates, portions of such sugary liquid being removed from time to time to prevent interference with the hydrolyzation; substantially as described.

6. The process of producing glucose-like products from woody material such as sawdust and the like, which comprises exposing a mass of such material to the action of a current of steam carrying hydrochloric acid until a mass of sugary liquid accumulates, portions of such sugary liquid being removed from time to time to prevent interference with the hydrolyzation; substantially as described.

7. The process of producing glucose-like products from woody material such as sawdust and the like, which comprises hydrolyzing such material in a heated condition by treating it with a hydrolyzing acid, and positively circulating the gases resulting from the hydrolyzation through the material undergoing treatment; substantially as described.

8. The process of producing glucose-like products from woody material such as sawdust and the like, which comprises hydrolyzing such material in a heated condition by treating it with a volatile hydrolyzing acid, and positively circulating the gases resulting from the hydrolyzation through the material undergoing treatment; substantially as described.

9. The process of producing glucose-like products which comprises hydrolyzing a mass of such material in a heated condition by treatment with a volatile hydrolyzing acid, removing the reaction gases from the sphere of reaction, and forcing the gases thus removed back into the mass of material undergoing treatment; substantially as described.

10. The process of producing glucose-like products which comprises hydrolyzing a mass of such material in a heated condition by treatment with dilute hydrochloric acid, removing the reaction gases from the sphere of reaction and forcing the gases thus removed back into the mass of material undergoing treatment; substantially as described.

11. The process of producing glucose-like products which comprises hydrolyzing a mass of such material in a heated condition by treatment with dilute hydrochloric acid, removing the reaction gases from the sphere of reaction, and injecting the gases thus removed into the mass undergoing treatment by means of a current of steam; substantially as described.

12. The process of obtaining a fermentable glucose-like product from cellulosic and ligneous material, which consists in subjecting it to the hydrolyzing action of a weak solution of hydrochloric acid, the minimum weight of the solution not differing substantially from the weight of the dry constituents of the mass; substantially as described.

13. The process of obtaining a fermentable glucose-like product from cellulosic and ligneous material, which comprises first effecting a partial hydrolyzation thereof and extracting the product thus made, and thereafter subjecting the residual material to the hydrolyzing action of a weak solution of hydrochloric acid; substantially as described.

14. The process of obtaining a fermentable glucose-like product from cellulosic and ligneous material, which comprises first effecting a partial hydrolyzation thereof with sulfurous acid and extracting the product thus made, and thereafter subjecting the residual material to the hydrolyzing action of a weak solution of hydrochloric acid; substantially as described.

In testimony whereof I affix my signature, in presence of two witnesses.

WALLACE P. COHOE.

Witnesses:
E. MERNER,
H. CHRISTMAN.